(12) United States Patent
Jung (10) Patent No.: US 12,407,237 B2
(45) Date of Patent: Sep. 2, 2025

(54) NON-CONTACT NO-LOAD POWER TRANSMISSION DEVICE

(71) Applicant: TAE YOUNG FAN GUARD CO., LTD., Busan (KR)

(72) Inventor: Gil Yong Jung, Busan (KR)

( * ) Notice: Subject to any disclaimer, the term of this patent is extended or adjusted under 35 U.S.C. 154(b) by 433 days.

(21) Appl. No.: 17/927,868

(22) PCT Filed: Jul. 28, 2020

(86) PCT No.: PCT/KR2020/009947
§ 371 (c)(1),
(2) Date: Nov. 25, 2022

(87) PCT Pub. No.: WO2022/025307
PCT Pub. Date: Feb. 3, 2022

(65) Prior Publication Data
US 2023/0243390 A1    Aug. 3, 2023

(30) Foreign Application Priority Data

Jul. 27, 2020 (KR) .......................... 10-2020-0092754

(51) Int. Cl.
*H02K 49/10* (2006.01)
*F16D 27/14* (2006.01)
(Continued)

(52) U.S. Cl.
CPC ............ *H02K 49/108* (2013.01); *F16D 27/14* (2013.01); *H02K 1/32* (2013.01); *F16D 27/01* (2013.01);
(Continued)

(58) Field of Classification Search
CPC ...... H02K 49/108; H02K 1/32; H02K 1/2795; H02K 1/28; F16D 27/14; F16D 27/01; F16D 2300/0212
(Continued)

(56) References Cited

U.S. PATENT DOCUMENTS

| | | | | |
|---|---|---|---|---|
| 3,283,588 | A | * | 11/1966 | Merchant .................. G01P 3/56 464/29 |
| 3,458,122 | A | * | 7/1969 | Andriussi ............... F01P 7/081 464/29 |
| 11,356,009 | B2 | * | 6/2022 | Kornman ................. H02K 1/32 |

FOREIGN PATENT DOCUMENTS

| CN | 106936290 A | 7/2017 |
|---|---|---|
| JP | H05-009184 U | 2/1993 |

(Continued)

OTHER PUBLICATIONS

Developing Experts, Non-Magnetic Material, retrieved from the internet Mar. 27, 2025 at <https://www.developingexperts.com/glossary/non-magnetic-material>. (Year: 2025).*

*Primary Examiner* — Greg Binda
(74) *Attorney, Agent, or Firm* — KORUS Patent, LLC; Seong Il Jeong (57) ABSTRACT

A non-contact no-load power transmission device which can transmit power in a non-contact no-load state by using a magnetic-to-nonmagnetic structure. For this purpose, provided is a non-contact no-load power transmission device characterized by operating in a non-contact manner and comprising: a first disc unit 10 coupled to one of a power shaft or a load shaft and having a magnetic body on one side surface; and a second disc unit 20 coupled to the power shaft or the load shaft that corresponds to the first disc unit 10 and formed of a non-magnetized body that attracts the magnetic body.

16 Claims, 10 Drawing Sheets

(51) Int. Cl.
*H02K 1/32* (2006.01)
*F16D 27/01* (2006.01)
*H02K 1/2795* (2022.01)
*H02K 1/28* (2006.01)

(52) U.S. Cl.
CPC .... *F16D 2300/0212* (2013.01); *H02K 1/2795* (2022.01); *H02K 1/28* (2013.01)

(58) Field of Classification Search
USPC ..................................................... 464/17, 29
See application file for complete search history.

(56) References Cited

FOREIGN PATENT DOCUMENTS

| | | | |
|---|---|---|---|
| JP | 2001-289385 | A | 10/2001 |
| JP | 2008-271614 | A | 11/2008 |
| JP | 2013-213552 | A | 10/2013 |
| JP | 2015-081647 | A | 4/2015 |
| KR | 10-2005-0017885 | A | 2/2005 |
| KR | 10-1282813 | B1 | 7/2013 |
| KR | 10-1299704 | B1 | 8/2013 |
| KR | 20-2013-0006110 | U | 10/2013 |
| KR | 10-1783687 | B1 | 10/2017 |
| KR | 10-2019-0141306 | A | 12/2019 |
| KR | 10-2065450 | B1 | 1/2020 |
| KR | 10-2095825 | B1 | 4/2020 |
| WO | 2019/074176 | A1 | 4/2019 |

* cited by examiner

Prior Art

NON-CONTACT NO-LOAD POWER TRANSMISSION DEVICE

TECHNICAL FIELD

The present invention relates to a non-contact no-load power transmission device which can transmit power in a non-contact no-load state by using a magnetic-to-non-magnetized structure.

BACKGROUND ART

The contents described in this section merely provides background information on one embodiment of the present invention and does not constitute the prior art.

Generally, various types of devices exist in the power transmission device. Among them, representative ones are power transmission using gears, transmission using pulleys and bolts, and the like as a means of transmitting physical force by mechanical contact. Such a paired power transmission device is called a coupler, a coupling or the like.

This coupling is for transmitting a driving force, which is for connecting two different shafts, such as a power shaft that is connected to a motor, an engine or the like to transmit driving force, and a load side or a driven shaft that is connected to a rotating object side such as a pump, so that the two shafts can rotate at the same time.

Such couplings engage and rotate through a mechanical connection, which may lead to frictional noise, dust, vibration, reduced energy efficiency, reduced durability, and mechanical burnout.

Also, when a high-load rotating object is located on the load shaft or the driven shaft during initial operation, high load is applied equally to the power shaft. Thus, the life of the motor, engine or the like is shortened, or during work such as sudden stop or rapid rotation direction change in response to an abnormal situation, mechanical impact is transmitted without buffer to the power shaft so that damage frequently occurs.

Therefore, a magnetic coupling using the magnetic force of a magnet is used so that coupling via a mechanical connection prevents the generation of noise and vibration, or as an example, the electric motor of the power shaft is prevented from being overloaded as the load shaft or the driven shaft stops its rotation due to foreign matters being caught in the pump.

In this regard, various types of couplings have been proposed. Among them, a representative one is Korean Unexamined Patent Publication No. 10-2015-0017885 entitled non-contact power transmission structure using magnetic force (hereinafter referred to as 'prior art', published on Feb. 23, 2015), which relates to a structure for transmitting power while connecting between a separated main driving shaft and a driven shaft, and more specifically, relates to a set of magnets comprising: a first magnet formed in the center and having either polarity of N pole and S pole; and a second magnet formed outside the first magnet and divided into a plurality of N poles and S poles, and provides a non-contact power transmission structure using a magnetic force that can transmit a power of a main driving shaft to the driven shaft using the magnetic force in a non-contact state.

However, the prior art as described above has a structure that utilizes an attractive force and a repulsive force of the magnet disposed on the power shaft disk and the magnet disposed on the load shaft disk, which is disadvantageous in that periodic slip phenomenon occurs, making it difficult to transmit a constant power, and it has an integrated structure in order to overcome the periodic slip phenomenon.

In addition, other general magnetic couplings generate magnetic heat and resistance heat due to eddy currents when attractive force and repulsive force occur, and the high heat generated in this way is the main cause of the decrease in magnetic force, which lowers the energy efficiency. In the case of the existing general coupling, the problems have been solved by installing and operating a valve for controlling flow rate, but this process is a major cause of overloading, resulting in mechanical burnout and reduced energy efficiency. That is, the conventional magnetic coupling does not efficiently transmit power from the motor side to the driven shaft, so the power transmission efficiency is slightly low, and the power transmission efficiency of the motor is low, which makes it difficult to precisely control the rotation of the driven shaft.

DETAILED DESCRIPTION OF THE INVENTION

Technical Problem

The present invention has been devised to solve the above-mentioned problems, and an object of the present invention is to provide a disk containing a magnetic body so that it can be operated by being coupled to one of a power shaft or a load shaft; and a magnetic coupling that minimizes heat generation due to slip or eddy current generation and can transmit power by a magnetic force formed between the non-magnetized disks disposed on the load shaft or the power side corresponding thereto in accordance with an embodiment of the present invention.

Another object of the present invention is to provide a magnetic coupling that can control the amount of load on the load shaft to which the rotating object is coupled to prevent damage to the power source such as the motor or engine of the power shaft.

However, the technical problems to be achieved by the present embodiment is not limited to the above-mentioned technical problems, and other technical problems may exist.

Technical Solution

In order to achieve the above object, according to one embodiment of the present invention, there is provided a non-contact no-load power transmission device consisting of a power shaft and a load shaft,
  characterized by operating in a non-contact no-load manner and comprising: a first disc unit 10 coupled to one of a power shaft or a load shaft and having a magnetic body on one side surface; and a second disc unit 20 coupled to the power shaft or the load shaft that corresponds to the first disc unit 10 and formed of a non-magnetized body that exerts an attractive force on the magnetic body.
  Wherein, the positions of the first disk unit 10 and the second disk unit 20 are spaced apart or close to each other, thereby capable of controlling the number of rotations and the amount of load applied to the coupling.
  Also, the first disk unit 10 comprises a first disk 11, a magnetic body 13 that is radially disposed and coupled on one side of the first disk 11, a magnetic force forming plate 12 that is in contact with one side of the magnetic body 13 and discharges the magnetic force generated from the magnetic body 13 to the outside, and a magnetic force forming fastening member 14 that fastens and binds the magnetic body 13 to the first disk 11 and discharges the magnetic force to the outside. A plurality of magnetic bodies 13 are alternately arranged by N poles and S poles, and the first disk 11 is further formed with a heat radiation hole 112 for releasing hot air generated by eddy currents generated in accordance with the rotation of the magnetic body 13 and the change in polarity.

Further, the magnetic force forming fastening member 14 and the magnetic force forming plate 12, which is in contact with one side surface of the magnetic force forming fastening member 14, are formed in an enclosure structure in which the magnetic body 13 is inserted, and a part of the magnetic force forming fastening member 14 is directed to the outside, so that the magnetic force generated from the magnetic body 13 can be concentrated in the direction of the second disk unit 20.

Further, the second disk unit 20 comprises a second disk 21, and a magnetic force enhancement plate 22 coupled to one side surface of the second disk 21, and a corrosion prevention plate 23 for preventing corrosion of the second disk 21 and the magnetic force enhancement plate 22 due to dissimilar metals or the like is further provided between the second disk 21 and the magnetic force enhancement plate 22.

Wherein, the magnetic force enhancement plate 22 is further formed with a heat dissipation hole 221 that discharges hot air generated by the eddy current and enables generation of eddy currents, and the heat dissipation hole 221 is formed in various shapes such as a point shape, a curved shape, a sector shape with a narrow width, and a deformed ⊥ shape.

Further, the first disk unit 10 and the second disk unit 20 are located on the same horizontal axis with the center of the power shaft or the load shaft coupled to the first disk unit 10 and the second disk unit 20 due to the eddy current generated by the magnetic force and the rotating magnetic field, or when shifted in any direction, such as upward or downward, it can be driven even if the center of the power shaft or the load shaft maintains a torsion angle. Due to the magnetic force generated between the first disk unit 10 and the second disk unit 20 and the eddy current generated by the rotating magnetic field, a plurality of load shafts can be driven to correspond to one power shaft.

In addition, the object of the present invention can be better achieved by providing the non-contact no-load power transmission device wherein: only the attractive force between the magnetic body and the non-magnetized body is generated so that it can be driven regardless of the polarity change, an eddy current is generated by the polarity change that changes according to the rotation of the magnetic body, i.e., the rotating magnetic field, and non-magnetized body rotates by the rotating magnetic field, which can avoid physical impact and mechanical damage from sudden stop during operation or reverse rotation during forward rotation, and cushioning is provided due to the space between the two disk units by a non-contact type, enabling smooth reverse rotation during operation without physical impact or mechanical damage to the power shaft and load shaft.

Advantageous Effects

According to the embodiments of the present invention described above, due to the magnetic force formed between a disk containing a magnetic body disposed on a load shaft and a nonmagnet disk disposed on a power shaft, power is transmitted in a non-contact and no-load state, which can free from mechanical burnout, noise, vibration, and dust, and provides stable output without periodic slip phenomenon as compared to conventional magnetic coupling.

In addition, due to the magnetic coupling of the magnet-to-nonmagnet structure, forward rotation and reverse rotation are possible, and the rotation speed and output amount can be controlled by freely adjusting the spacing, thereby maximizing energy efficiency.

DETAILED DESCRIPTION OF THE EMBODIMENTS

Hereinafter, embodiments of the present invention will be described in detail with reference to the accompanying drawings so that those skilled in the art can easily carry out them. However, the present invention can be modified in various different ways, and is not limited to the embodiments set forth herein. Parts that are irrelevant to the description in the drawings will be omitted to more clearly describe the present invention, and the same or similar constituent elements will be designated by the same reference numerals throughout the specification.

Throughout the specification, when it is described that an element is "connected" to another element, the element may be "directly connected" to the other element or "electrically connected" to the other element through a third element. In addition, throughout the specification, unless explicitly described to the contrary, it should be understood that the word "comprise" and variations such as "comprises" or "comprising" further imply the inclusion of stated elements but not the exclusion of any other elements, and that they do not preclude the presence or addition of one or more other features, integers, steps, actions, components, parts or combinations thereof.

It is obvious that the following embodiments are detailed descriptions for helping understanding of the present invention and do not limit the scope of the present invention. Thus, an equivalent invention for performing the same function as that of the present invention is also within the scope of the present invention.

Now, an embodiment of the present invention will be described in detail with reference to the accompanying drawings.

Figure 1:
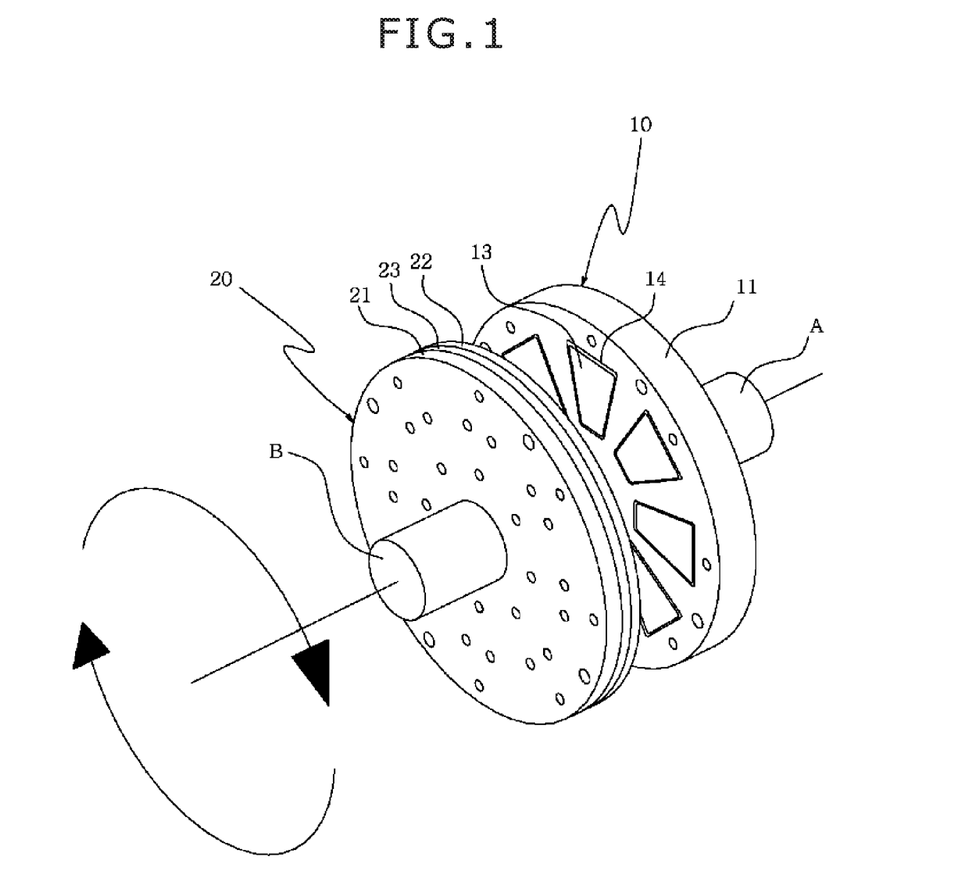
FIG. 1 is a diagram which explains the configuration of a non-contact no-load power transmission device according to one embodiment of the present invention.
Figure 2:
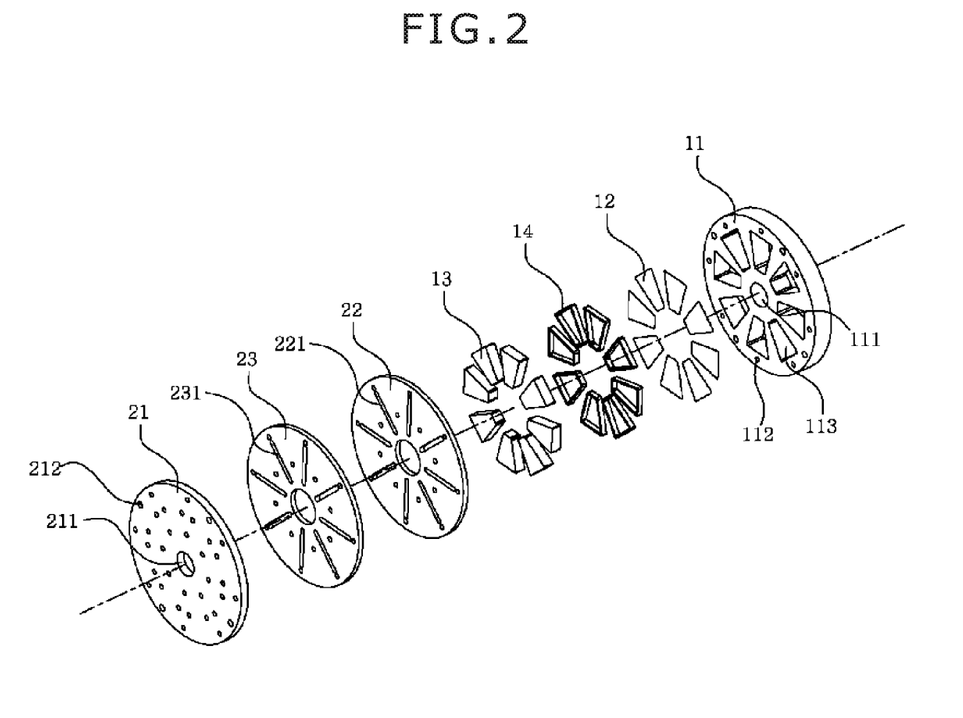
FIG. 2 is an exploded perspective view of FIG. 1.
Figure 3:
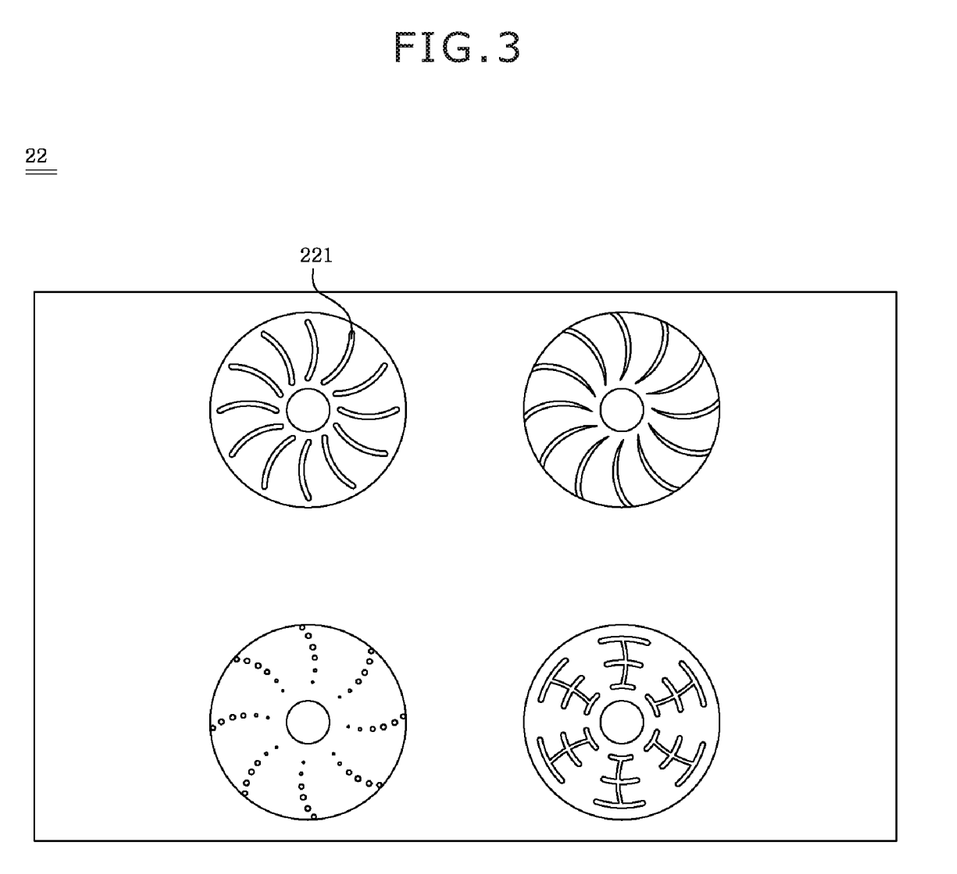
FIG. 3 is a diagram which explains various forms of magnetic force enhancement plates, which are partial components of FIG. 1.
Figure 4A:
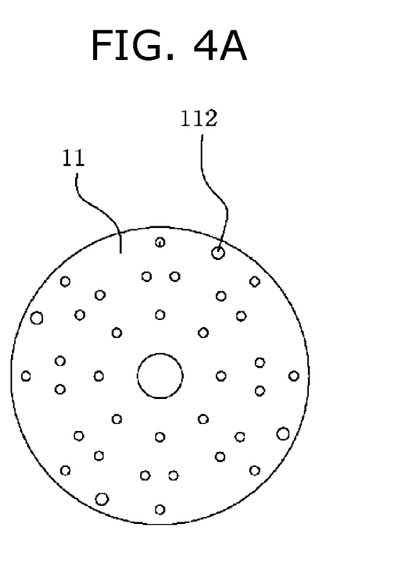
FIGS. 4A-4B are diagrams which show the first disk of FIG. 1.
Figure 4B:
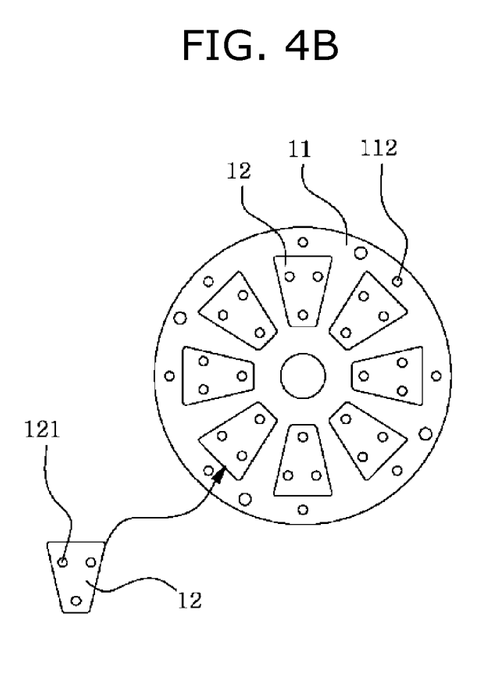
Figure 5:
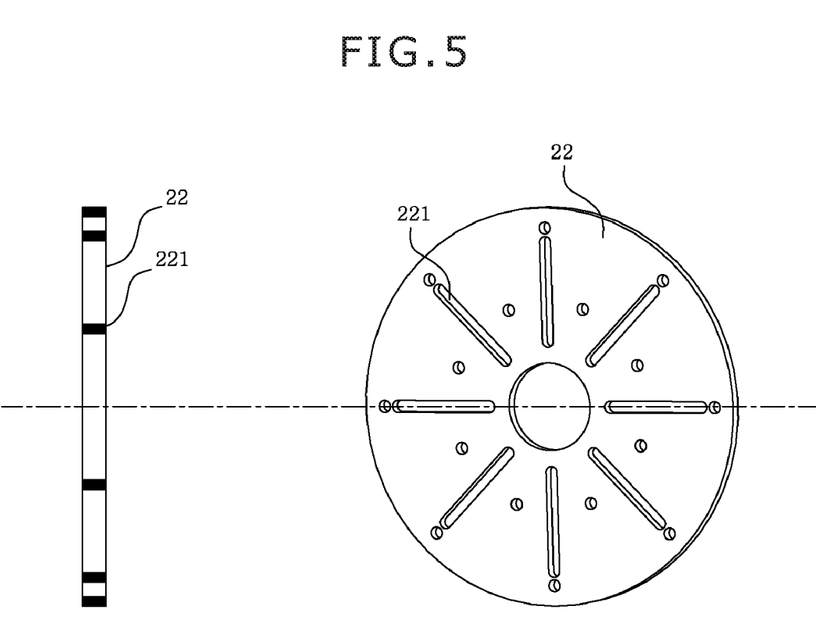
FIG. 5 is a diagram which explains the configuration of a magnetic force enhancement plate, which is partial components of FIG. 1.
Figure 6A:
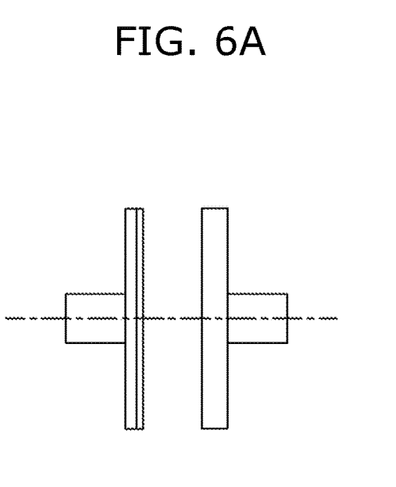
FIGS. 6A-6D are diagrams which explain a process of adjusting the front/rear, up/down spacing of the non-contact no-load power transmission device according to one embodiment of the present invention.
Figure 6B:
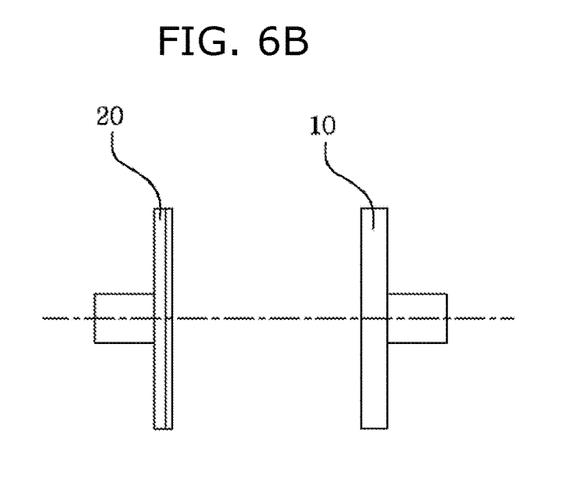
Figure 6C:
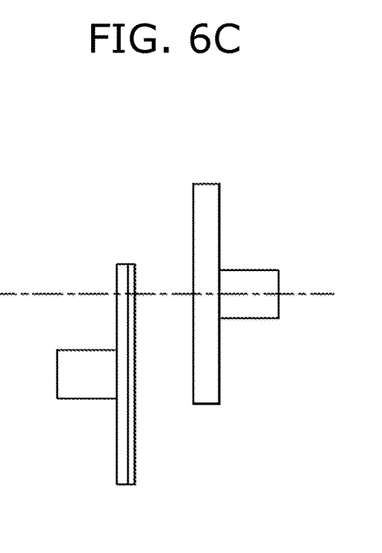
Figure 6D:
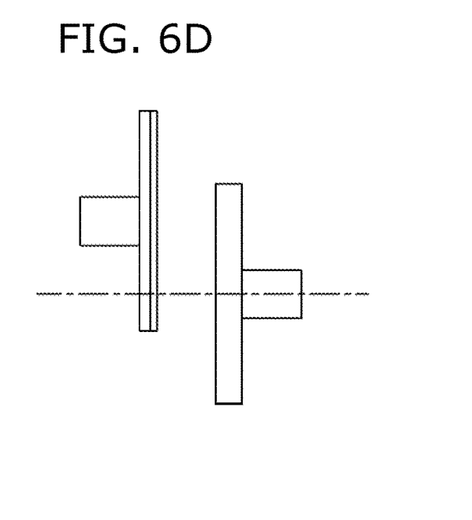

FIG. 1 is a diagram which explains the configuration of a non-contact no-load power transmission device according to one embodiment of the present invention. FIG. 2 is an exploded perspective view of FIG. 1. FIG. 3 is a diagram which explains various forms of magnetic force enhancement plates, which are partial components of FIG. 1. FIGS. 4A-4B are diagrams which show the first disk of FIG. 1. FIG. 5 is a diagram which explains the configuration of a magnetic force enhancement plate, which is partial components of FIG. 1.

Referring to FIGS. 1 and 2, a non-contact no-load power transmission device of the present invention comprises a first disc unit 10 coupled to one of a power shaft or a load shaft and having a magnetic body on one side surface; and a second disc unit 20 coupled to the power shaft or the load shaft that corresponds to the first disc unit 10 and formed of a non-magnetized body, wherein the first disk unit 10 and the second disk unit 20 face each other and are spaced apart to operate in a non-contact manner.

At this time, the first disk unit 10 comprises a first disk 11, a magnetic body 13 that is radially disposed and coupled on one side of the first disk 11, a magnetic force forming plate 12 that is in contact with one side of the magnetic body 13 and discharges the magnetic force generated from the magnetic body 13 to the outside, and a magnetic force forming fastening member 14 that fastens and binds the magnetic body 13 to the first disk 11 and discharges the magnetic force to the outside.

Here, the first disk 11 is formed with a shaft coupling hole 111 so that either one of the power shaft A or the load shaft B can be fastened to the center, and is further formed with a magnetic inlet hole 113 that forms an etched space inward so that the magnetic material 13 can be radially arranged and coupled around the shaft coupling hole 111.

In addition, the first disk 11 is formed with a heat dissipation hole 112 that dissipates hot air generated by an eddy current generated according to a rotating magnetic field whose polarity changes as the magnetic body 13 rotates.

At this time, a plurality of the heat dissipation holes 112 are formed to penetrate from one surface of the first disk 11 to the other surface.

The magnetic body 13 fastened and coupled to the first disk 11 formed as described above may be a normal permanent magnet, but is not limited thereto, and anything can be used as long as it can generate a magnetic force, such as permanent magnet and electromagnet.

Here, the magnetic body 13 is radially arranged around the shaft coupling hole 111 of the first disk 11 and coupled. When the first disk unit 10 rotates, in order to compensate for the rotation trajectory difference with respect to the separation distance from the central axis, it has a quadrangle in the shape of wide and narrow at the top and wide at the bottom or wide at the top or narrow at the bottom, or its cross-section has a sector or trapezoid shape, and is formed in a shape having a long arc on the outside and a short arc on the inside, but is not limited thereto, and can be formed in various shapes.

Further, when the magnetic body 13 is radially disposed around the shaft coupling hole 111 on one side of the first disk 11, a plurality of magnetic bodies are alternately arranged by N poles and S poles.

Further, a magnetic force forming plate 12, which is in contact with one side of the magnetic body 13, drawn in the magnetic body drawing-in hole 113 of the first disk 11, and releases the magnetic force generated from the magnetic body 13 to the outside, is formed so as to have the same shape as the magnetic body 13.

Here, the magnetic force forming plate 12 is coupled to the inside of the first disk 11 to increases the magnetic permeability of the magnetic body 13 in the direction of the second disk unit 20 corresponding to the first disk unit 10.

The magnetic force forming plate 12 as described above is preferably formed of a material that can increase the magnetic permeability. In the present invention, a silicon steel plate, an amorphous magnetic body, aluminum, or the like can be used, but the present invention is not limited thereto, and any material can be used as long as it can increase the magnetic permeability.

The magnetic force forming plate 12 is further provided with a plurality of heat dissipation holes 121, which is for dissipating hot air generated from the magnetic body 13 by an eddy current.

Further, the magnetic force forming plate 12 is supported by contacting the magnetic force forming plate 12 at one side thereof, and the magnetic force forming fastening member 14, which is inserted in the magnetic body 13 so that the outer surface of the magnetic body 13 is in contact with the inner surface of the magnetic member 13, is also formed of the same material as the magnetic force forming plate 12.

More specifically, the magnetic force forming fastening member 14 is forcedly fitted between the inner surface of the magnetic drawing-in hole 113 of the first disk 11 and the magnetic body 13, and at the same time, the magnetic force of the magnetic force forming plate 12 and the magnetic body 13 can be released to the outside to improve the magnetic permeability.

This allows the magnetic force forming fastening member 14 and the magnetic force forming plate 12 in contact with one side of the magnetic force forming fastening member 14 to be formed in an enclosure structure in which the magnetic body 13 is inserted, and a part of the magnetic force forming fastening member 14 is directed to the outside, so that the magnetic force generated from the magnetic body 13 can be concentrated in the direction of the second disk unit 20.

A second disk unit 20, which corresponds to the first disk unit 10 as described above, is spaced apart from one side, and is fastened to a power shaft or a load shaft corresponding to a power shaft coupled to the first disk unit 10 or a load shaft, is composed of a non-magnetized body that allows for uniform rotation by the magnetic force generated from the magnetic body of the first disk unit 10.

Here, the non-magnetized body can be used without as long as it any metal or nonmetal material that can maintain attractive force with the magnetic body or it can maintain attractive force with the magnetic body.

More specifically, it refers to a material that is formed by containing metal powder or the like in a metal disk or synthetic resin, and can maintain attractive force with a magnetic body.

The second disk unit 20 as described above is composed of a disk-shaped second disk 21 in which a shaft coupling hole 211 capable of fastening one of a power shaft A or a load shaft B is formed in the center, and a plurality of heat dissipation holes 212 are further formed around the fastening hole 211.

At this time, the heat dissipation hole 212 is radially disposed and formed around the shaft coupling hole 211.

One side surface of the second disk 21 is provided with a magnetic force enhancement plate 22, corresponding to eddy current generated in the first disk unit 10, and capable of increasing the attractive force with the magnetic force generated from the magnetic body 13, and a corrosion prevention plate 23 is further provided between the magnetic force enhancement plate 22 and the second disk 21 to prevent corrosion caused by corrosion of dissimilar metals or the like.

Here, the corrosion prevention plate 23 is preferably formed of a heat absorbing material such as ceramic paper for preventing corrosion between dissimilar metals and absorbing heat, but is not limited thereto, and any material can be used as long as it can prevent corrosion caused by eddy currents between dissimilar metals.

The magnetic force enhancement plate 22 as described above is further formed with a heat dissipation hole 221 for discharging hot air generated by the eddy current and generating the eddy current.

At this time, the heat dissipation hole 221 may have a structure in which various shapes of holes such as a point shape, a curved shape, a fan shape with a narrow width, and a deformed 王 shape, are arranged in a radial shape as shown in FIG. 3.

In this manner, the heat generated by the eddy current is discharged to the outside, thereby capable of preventing the magnetic force of the magnetic body 13 from decreasing due to the magnetic heat and resistance heat, and smoothly transmitting the rotational power generated on the power side to the load shaft.

Figure 7A:
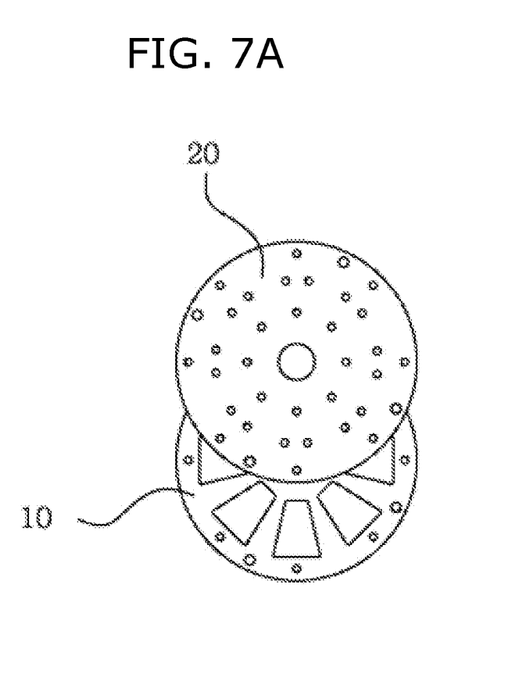
FIGS. 7A-7C are diagrams which explain a process of adjusting the upper/lower, left/right spacing of the first disk and the second disk according to FIGS. 6A-6D.
Figure 7B:
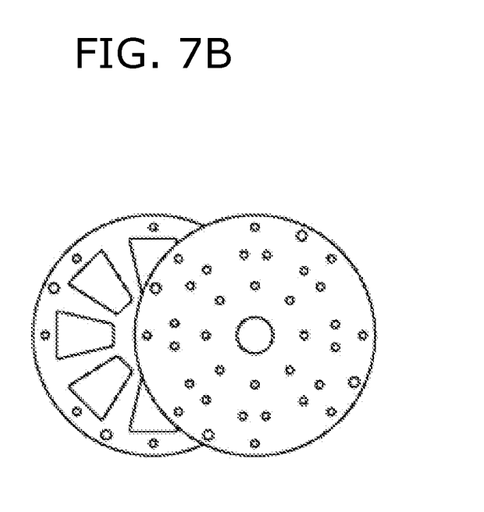
Figure 7C:
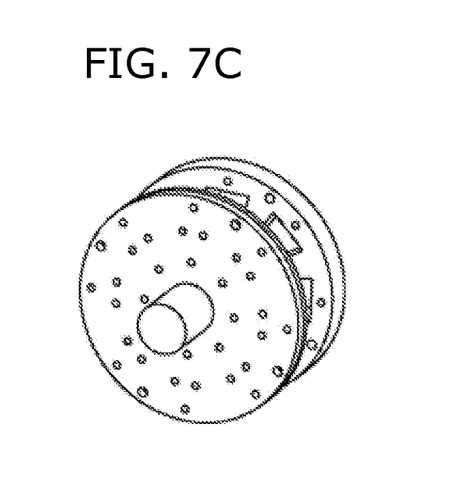
Figure 8A:
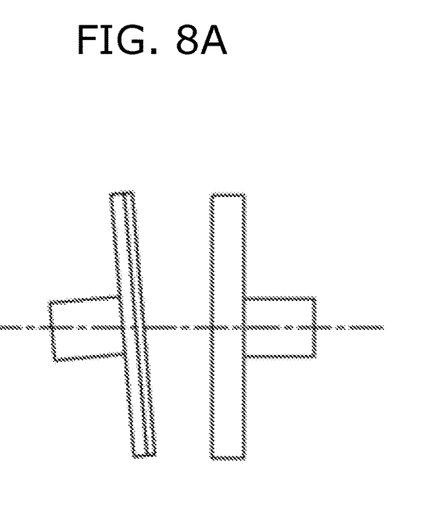
FIGS. 8A-8D are diagrams which explain a state in which the first axis of the first disk and the second axis of the second disk have deviated from horizontal according to one embodiment of the present invention.
Figure 8B:
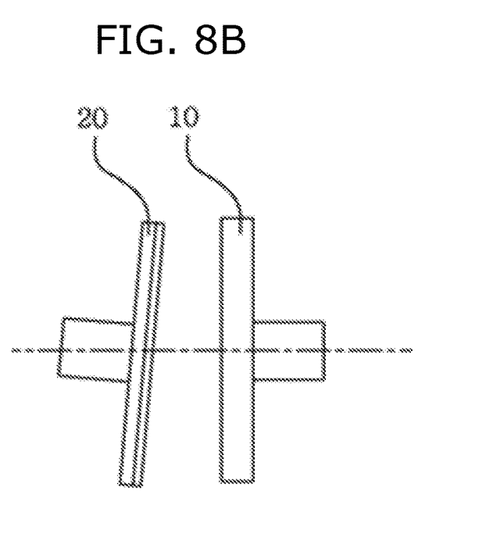
Figure 8C:
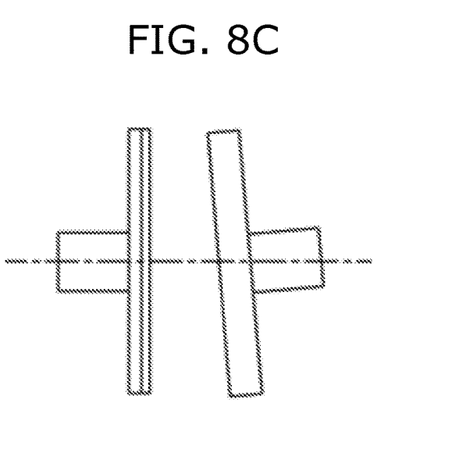
Figure 8D:
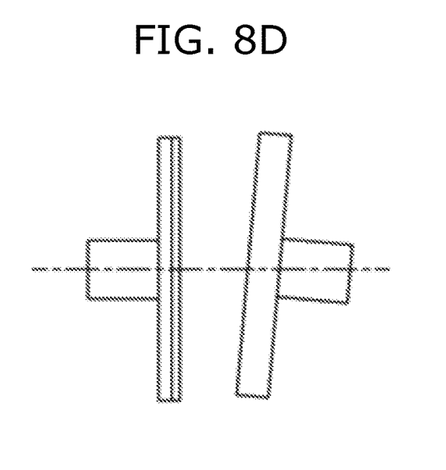
Figure 9:
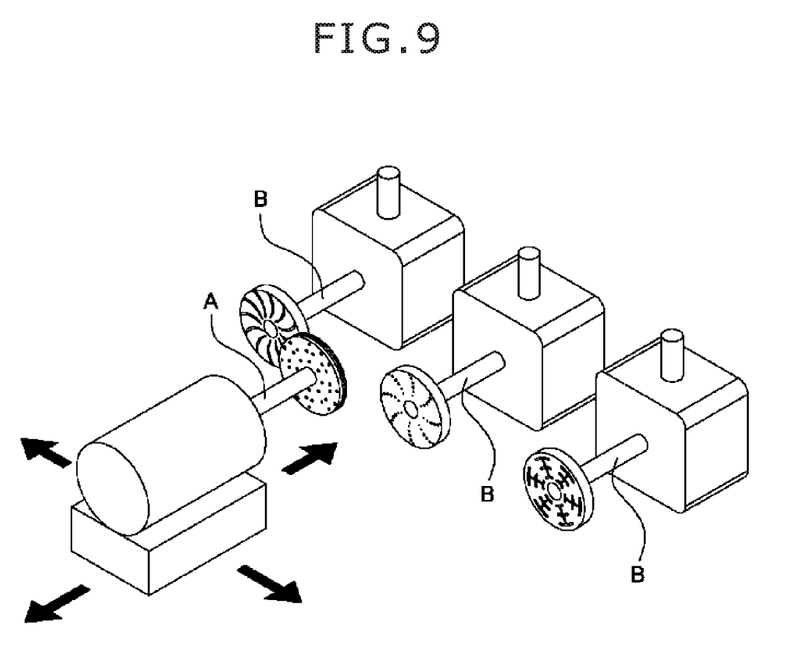
FIG. 9 is an exemplary view which explains a power transmission structure to which a plurality of load shafts are applied according to one embodiment of the present invention.

FIGS. 6A-6D are diagrams which explain a process of adjusting the front/rear, up/down spacing of the non-contact no-load power transmission device according to one embodiment of the present invention. FIGS. 7A-7C are diagrams which explain a process of adjusting the upper/lower, left/right spacing of the first disk and the second disk according to FIGS. 6A-6D. FIGS. 8A-8D are diagrams which explain a state in which the first axis of the first disk and the second axis of the second disk have deviated from horizontal according to one embodiment of the present invention. FIG. 9 is an exemplary view which explains a power transmission structure to which a plurality of load shafts are applied according to one embodiment of the present invention.

Figure 10:
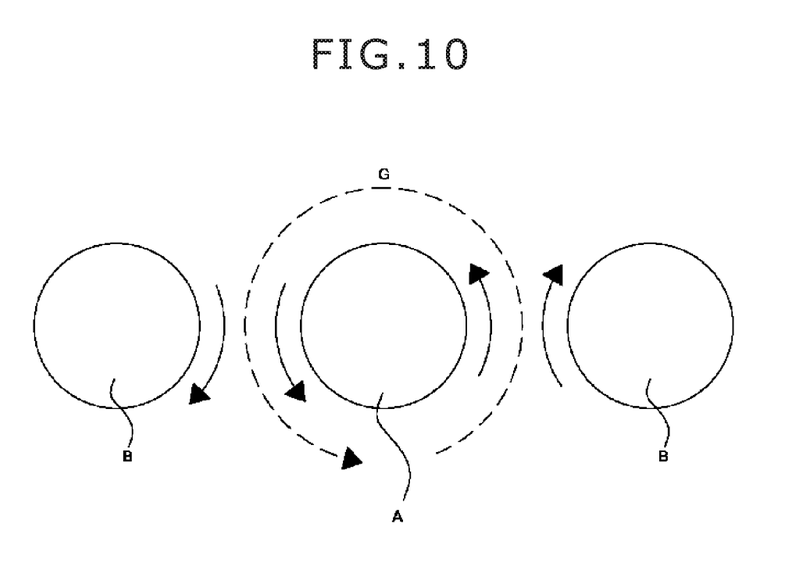
FIG. 10 is an exemplary view which explains a power transmission method of a power transmission structure to which a plurality of load shafts are applied according to one embodiment of the present invention.

Further, FIG. 10 is an exemplary view which explains a power transmission method of a power transmission structure to which a plurality of load shafts are applied according to one embodiment of the present invention.

When described in detail with reference to FIGS. 6A to 10, the non-contact no-load power transmission device according to the present invention can control the rotation speed and the amount of load in a no-load state by adjusting the spacing between the first disk unit 10 and the second disk unit 20, including the distance between the disks and the arrangement direction, in various directions such as vertical direction, horizontal direction, up and down, left and right, etc. For this purpose, the no-load magnetic coupling can be set manually or automatically by an administrator via control means (not shown).

More specifically, the positions of the second disk unit 20 connected to the load shaft B is spaced apart or close to each other, so that the load force applied to the non-contact no-load power transmission device can be adjusted.

For example, the separation distance between the adjacent surfaces of the first disk unit 10 and the second disk unit 20 can be adjusted to attenuate or increase the magnetic force of the magnetic body, so that the driving force of the power shaft A is adjusted, or the load amount of the load shaft (B) can be adjusted.

As shown in FIGS. 6A-6D and 7A-7C, assuming a first axis A and the second axis 2 with respect to the power shaft A or the load shaft B, when the two axes are on the same horizontal axis, the spacing between the first disk unit 10 and the second disk unit 20 can be narrowed or widened, and even when the first axis A and the second axis B are not on the same horizontal axis line and are shifted upward or downward, the spacing between the first disk unit 10 and the second disk unit 20 can be narrowed or widened.

Figure 11:
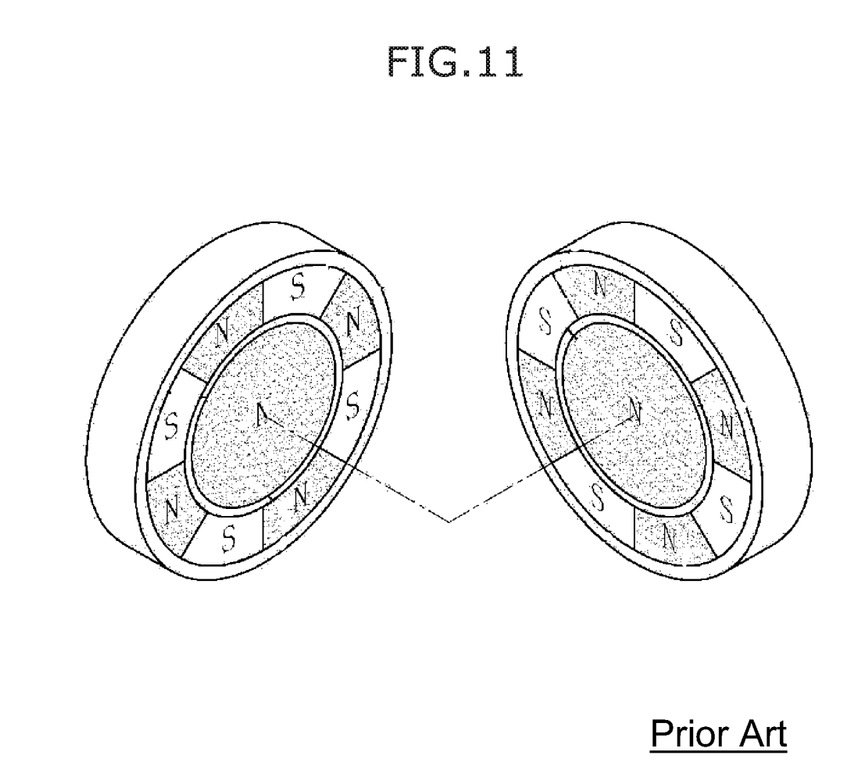
FIG. 11 is an exemplary view which shows a non-contact magnetic power transmission structure to which a conventional magnet-to-magnet is applied.

Meanwhile, as shown in FIGS. 8A-8D, even if the first axis A and the second axis B completely deviates from the horizontal axis line, alignment, balance and the like can overcome the limit of twist angle in any direction. In the case of a conventional magnetic coupling, a magnetic body is provided on one side, and another magnetic body is provided even on the other side corresponding thereto. FIG. 11 is an exemplary view which shows a non-contact magnetic power transmission structure to which a conventional magnet-to-magnet is applied. When a plurality of magnetic bodies change their polarity with rotation, attractive force and repulsive force are generated alternately. Thus, when the two axes are separated from the same axis, the two surfaces can be brought together by attractive force or separated by repulsive force to overcome the impossibility of manipulation.

For this purpose, in the present invention, one side of the coupling is provided with a magnetic body, and the other side corresponding thereto is provided with a non-magnetized body that allows the attractive force with the magnetic body to be maintained. Thus, even if the two axes are not located on the same line or a predetermined separation angle is generated between the two axes, the magnetic force and the eddy current generated by the rotation of the magnetic force enable rotation.

In the case of a conventional magnetic coupling, when controlling a sudden stop during operation or reverse rotation during forward rotation, it is impossible because the polarities of the magnetic bodies facing each other change, and the attractive force and the repulsive force are generated at the same time, whereas the non-contact no-load power transmission device of the present invention can be driven regardless of the polarity change because only attractive force is generated in the non-contact no-load state, and an eddy current is generated by the polarity change that changes according to the rotation of the magnetic body, that is, an eddy current is generated by the rotating magnetic field, and the non-magnetized body rotates by the rotating magnetic field, which enables a sudden stop during operation or reverse rotation during forward rotation without physical impact or mechanical damage.

In addition, it provides a cushioning phenomenon due to the separation space between the two disk units in a non-contact manner, enabling smooth reverse rotation during operation without physical impact or mechanical damage to the power shaft and the load shaft.

In this manner, the non-contact no-load power transmission device transmits power via magnetic force and rotation of the magnetic force formed between the disk unit disposed on the load shaft, i.e., the driven shaft, and the disk unit disposed on the power side, that is, the eddy current generated by the rotating magnetic field, and can transmit power in a completely non-contact, no-load state due to its magnet-to-non-magnet structure, and is free from mechanical burn-out, noise, vibration, and dust as compared to the conventional magnetic coupling (see FIG. 11) and increases energy efficiency.

Further, by adjusting the separation distance between the power shaft and the load shaft, the number of rotations and the load amount of the load shaft are adjusted, whereby in order to change the rotational speed of a motor or engine having the same torque in a drive system using an existing motor and engine, it was inconvenient to have to replace the motor or engine for each maximum rpm, but such inconvenience can be easily overcome.

More specifically, in the conventional one, even if the motor has the same torque, various poles such as 2-pole, 4-pole, and 6-pole motors are used depending on the number of poles of the built-in magnetic body. For example, in the case of a motor applying 4 poles at the same frequency of 60 Hz, the maximum rotational speed is maintained at 1800 rpm, whereas in the case of a motor using 6 poles, the maximum rotational speed is maintained at 1200 rpm.

For this reason, in order to control the rotation speed of the load shaft, there was the inconvenience of having to replace the motor of the power shaft, and even if the same motor is applied, there was a problem that a transmission such as a separate reducer is needed more.

Further, according to the present invention, through various spacing adjustments between the first disk unit 10 and the second disk unit 20, the rotation speed and the load amount can be adjusted at the same time in a no-load state, and energy efficiency can be maximized.

Further, not only the magnetic force is reduced due to magnetic heat and resistance heat generated in the process of forming magnetic force, which are problems of conventional magnetic coupling, but also a corrosion prevention plate 23 is further provided to thereby prevent the corrosion of components from being accelerated, thereby capable of improving the durability of the product and further extending the mechanical life expectancy.

In this manner, the non-contact no-load power transmission device of the present invention has better mechanical efficiency and energy efficiency with lower installation and maintenance costs than expensive inverters and fluid couplings, and even if the first shaft A on the power side and the second shaft B on the load side are not completely horizontal, it can overcome the limitations of torsion angle such as alignment and balance that can be operated.

Further, as shown in FIG. 9, the power shaft A can be made movable, and a plurality of load shafts B can be disposed and driven on one power shaft A.

More specifically, one power shaft A is movably arranged, and arranged so as to face a plurality of load shafts B, and then moved adjacent to the load side (B) that needs to be driven, the corresponding load shaft (B) is driven or disposed adjacent to a plurality of load shafts B (see FIG. 10), and the corresponding load shaft B is driven by magnetic force and eddy current.

At this time, the power shaft A is movable in all directions movable in the space capable of controlling the driving of the load side in the front and rear left and right and up and down or the power shaft, thereby capable of controlling the driving of the load shaft B disposed to face the power shaft A.

The above description of the present invention is provided for the purpose of illustration, and it would be understood by those skilled in the art that various changes and modifications may be made without changing technical conception and essential features of the present invention. Thus, it is clear that the above-described embodiments are illustrative in all aspects and do not limit the present invention. For example, each component described to be of a single type can be implemented in a distributed manner. Likewise, components described to be distributed can be implemented in a combined manner.

The scope of the present invention is defined by the following claims rather than by the detailed description of the embodiment. It shall be understood that all modifications and embodiments conceived from the meaning and scope of the claims and their equivalents are included in the scope of the present invention.

DESCRIPTION OF REFERENCE NUMERALS

10: first disk unit
11: first disk
12: magnetic force forming plate
13: magnetic body
14: magnetic force forming fastening member
20: second disk unit
21: second disk
22: magnetic force enhancement plate
23: corrosion prevention plate

What is claimed is:

1. A non-contact no-load power transmission device consisting of a power shaft and a load shaft,
    characterized by operating in a non-contact manner and comprising: a first disc unit coupled to one of a power shaft or a load shaft and having a magnetic body on one side surface; and a second disc unit coupled to the power shaft or the load shaft that corresponds to the first disc unit and formed of a non-magnetized body that exerts an attractive force on the magnetic body,
    wherein:
    the first disk unit comprises a first disk, the magnetic body that is radially disposed and coupled on one side of the first disk, a magnetic force forming plate that is in contact with one side of the magnetic body, and a magnetic force forming fastening member that fastens and binds the magnetic body to the first disk,
    wherein:
    the first disk is further formed with a heat radiation hole for releasing hot air generated by eddy currents generated in accordance with the rotation of the magnetic body and the change in polarity.

2. The non-contact no-load power transmission device according to claim 1 wherein:
    the positions of the first disk unit and the second disk unit are spaced apart or close to each other, thereby controlling the number of rotations and the amount of load applied to the coupling.

3. The non-contact no-load power transmission device according to claim 2 wherein:
    the first disk unit and the second disk unit are located on the same horizontal axis with the center of the power shaft or the load shaft coupled to the first disk unit and the second disk unit due to the eddy current generated by the magnetic force and the rotating magnetic field, or when shifted in any direction, such as upward or downward, it can be driven even if the center of the power shaft or the load shaft maintains a torsion angle.

4. The non-contact no-load power transmission device according to claim 1 wherein:
a plurality of magnetic bodies are alternately arranged by N poles and S poles.

5. The non-contact no-load power transmission device according to claim 4 wherein:
the first disk unit and the second disk unit are located on the same horizontal axis with the center of the power shaft or the load shaft coupled to the first disk unit and the second disk unit due to the eddy current generated by the magnetic force and the rotating magnetic field, or when shifted in any direction, such as upward or downward, it can be driven even if the center of the power shaft or the load shaft maintains a torsion angle.

6. The non-contact no-load power transmission device according to claim 1 wherein:
the magnetic force forming fastening member and the magnetic force forming plate, which is in contact with one side surface of the magnetic force forming fastening member, are formed in an enclosure structure in which the magnetic body is inserted, and a part of the magnetic force forming fastening member is directed to the outside, so that the magnetic force generated from the magnetic body can be concentrated in the direction of the second disk unit.

7. The non-contact no-load power transmission device according to claim 6 wherein:
the first disk unit and the second disk unit are located on the same horizontal axis with the center of the power shaft or the load shaft coupled to the first disk unit and the second disk unit due to the eddy current generated by the magnetic force and the rotating magnetic field, or when shifted in any direction, such as upward or downward, it can be driven even if the center of the power shaft or the load shaft maintains a torsion angle.

8. The non-contact no-load power transmission device according to claim 1 wherein:
the second disk unit comprises a second disk, and a magnetic force enhancement plate coupled to one side surface of the second disk.

9. The non-contact no-load power transmission device according to claim 8 wherein:
the first disk unit and the second disk unit are located on the same horizontal axis with the center of the power shaft or the load shaft coupled to the first disk unit and the second disk unit due to the eddy current generated by the magnetic force and the rotating magnetic field, or when shifted in any direction, such as upward or downward, it can be driven even if the center of the power shaft or the load shaft maintains a torsion angle.

10. The non-contact no-load power transmission device according to claim 1 wherein:
the first disk unit and the second disk unit are located on the same horizontal axis with the center of the power shaft or the load shaft coupled to the first disk unit and the second disk unit due to the eddy current generated by the magnetic force and the rotating magnetic field, or when shifted in any direction, such as upward or downward, it can be driven even if the center of the power shaft or the load shaft maintains a torsion angle.

11. The non-contact no-load power transmission device according to claim 1 wherein:
due to the magnetic force generated between the first disk unit and the second disk unit and the eddy current generated by the rotating magnetic field, a plurality of load shafts can be driven to correspond to one power shaft.

12. The non-contact no-load power transmission device according to claim 1 wherein:
only the attractive force between the magnetic body and the non-magnetized body is generated so that it can be driven regardless of the polarity change, an eddy current is generated by the polarity change that changes according to the rotation of the magnetic body, i.e., the rotating magnetic field, and non-magnetized body rotates by the rotating magnetic field, which can avoid physical impact and mechanical damage from sudden stop during operation or reverse rotation during forward rotation, and cushioning is provided due to the space between the two disk units by a non-contact type, enabling smooth reverse rotation during operation without physical impact or mechanical damage to the power shaft and load shaft.

13. A non-contact no-load power transmission device consisting of a power shaft and a load shaft,
characterized by operating in a non-contact manner and comprising: a first disc unit coupled to one of a power shaft or a load shaft and having a magnetic body on one side surface; and a second disc unit coupled to the power shaft or the load shaft that corresponds to the first disc unit and formed of a non-magnetized body that exerts an attractive force on the magnetic body,
wherein:
the second disk unit comprises a second disk, and a magnetic force enhancement plate coupled to one side surface of the second disk,
wherein:
a corrosion prevention plate for preventing corrosion of the second disk and the magnetic force enhancement plate due to dissimilar metals is further provided between the second disk and the magnetic force enhancement plate.

14. The non-contact no-load power transmission device according to claim 13 wherein:
the first disk unit and the second disk unit are located on the same horizontal axis with the center of the power shaft or the load shaft coupled to the first disk unit and the second disk unit due to the eddy current generated by the magnetic force and the rotating magnetic field, or when shifted in any direction, such as upward or downward, it can be driven even if the center of the power shaft or the load shaft maintains a torsion angle.

15. A non-contact no-load power transmission device consisting of a power shaft and a load shaft,
characterized by operating in a non-contact manner and comprising: a first disc unit coupled to one of a power shaft or a load shaft and having a magnetic body on one side surface; and a second disc unit coupled to the power shaft or the load shaft that corresponds to the first disc unit and formed of a non-magnetized body that exerts an attractive force on the magnetic body,
wherein:
the second disk unit comprises a second disk, and a magnetic force enhancement plate coupled to one side surface of the second disk,
wherein:
the magnetic force enhancement plate is further formed with a heat dissipation hole that discharges hot air generated by the eddy current and enables generation of eddy currents, and the heat dissipation hole is formed in a point shape, a curved shape, a sector shape with a narrow width, or a deformed $\mp$ shape.

16. The non-contact no-load power transmission device according to claim 15 wherein:

the first disk unit and the second disk unit are located on the same horizontal axis with the center of the power shaft or the load shaft coupled to the first disk unit and the second disk unit due to the eddy current generated by the magnetic force and the rotating magnetic field, or when shifted in any direction, such as upward or downward, it can be driven even if the center of the power shaft or the load shaft maintains a torsion angle.

\* \* \* \* \*